US012798872B2

(12) United States Patent
Giersch

(10) Patent No.: US 12,798,872 B2
(45) Date of Patent: Nov. 17, 2026

(54) TANK SYSTEM FOR A HYDROGEN POWERED VEHICLE, FUEL CELL ASSEMBLY, HYDROGEN INTERNAL COMBUSTION ENGINE SYSTEM, FUEL CELL POWERED VEHICLE, HYDROGEN POWERED VEHICLE

(71) Applicant: Robert Bosch GmbH, Stuttgart (DE)

(72) Inventor: Dominik Giersch, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/128,605

(22) PCT Filed: Oct. 19, 2023

(86) PCT No.: PCT/EP2023/079097
§ 371 (c)(1),
(2) Date: May 9, 2025

(87) PCT Pub. No.: WO2024/110130
PCT Pub. Date: May 30, 2024

(65) Prior Publication Data

US 2026/0167413 A1 Jun. 18, 2026

(30) Foreign Application Priority Data

Nov. 25, 2022 (DE) ..................... 10 2022 212 635.1

(51) Int. Cl.
*B60K 15/03* (2006.01)
*B60K 15/067* (2006.01)
(Continued)

(52) U.S. Cl.
CPC .............. *B65D 90/06* (2013.01); *B60K 15/03* (2013.01); *B60K 15/03177* (2013.01);
(Continued)

(58) Field of Classification Search
CPC ...... B65D 90/06; B65D 90/08; B65D 88/128; B60K 15/03; B60K 15/03177;
(Continued)

(56) References Cited

U.S. PATENT DOCUMENTS 7,624,753 B2 * 12/2009 Suess .................. B60K 15/063 137/259
2019/0047404 A1 * 2/2019 Sawai .................... B60K 15/07
(Continued)

FOREIGN PATENT DOCUMENTS

DE 102013018779 A1 * 5/2015 ............ F17C 13/084
DE 102015009032 A1 * 1/2017 ............ F16C 23/045
(Continued)

OTHER PUBLICATIONS

Translation of International Search Report for Application No. PCT/EP2023/079097 dated Jan. 31, 2024 (2 pages).

*Primary Examiner* — Javier A Pagan
(74) *Attorney, Agent, or Firm* — Michael Best & Friedrich LLP

(57) ABSTRACT

A tank system (1) for a hydrogen-powered vehicle, wherein the tank system (1) comprises at least two tank containers (2) for storing a gaseous medium, in particular hydrogen, a frame-shaped housing element (24) and a feed line (4) connectable to the tank containers (2). The frame-shaped housing element (24) surrounds the at least two tank containers (2) and the feed line (4), wherein the at least two tank containers (2) run parallel to a longitudinal axis (9) of the tank system (1). Each of the at least two tank containers (2) is connected to the frame-shaped housing element (24) by means of a flexible bearing (35) and a fixed bearing (36). Moreover, the flexible bearing (35) comprises a bearing liner
(Continued)

element (50), with said bearing liner element (50) comprising layers of an elastomeric material (40) and layers of a rigid material (41).

16 Claims, 4 Drawing Sheets

(51) Int. Cl.

| | |
|---|---|
| ***B60K 15/07*** | (2006.01) |
| ***B65D 88/12*** | (2006.01) |
| ***B65D 90/04*** | (2006.01) |
| ***B65D 90/06*** | (2006.01) |
| ***B65D 90/08*** | (2006.01) |

(52) U.S. Cl.
CPC ............ *B60K 15/067* (2013.01); *B60K 15/07* (2013.01); *B65D 88/128* (2013.01); *B65D 90/046* (2013.01); *B65D 90/08* (2013.01)

(58) Field of Classification Search
CPC .. B60K 15/067; B60K 15/07; B60K 15/2015; B60K 15/03118; B60K 15/03144; B60K 15/03151
USPC .......................................................... 220/694
See application file for complete search history.

(56) References Cited

U.S. PATENT DOCUMENTS

| | | | | |
|---|---|---|---|---|
| 2021/0237562 | A1* | 8/2021 | Sawai | B60K 15/07 |
| 2023/0408039 | A1* | 12/2023 | Yim | F17C 13/084 |

FOREIGN PATENT DOCUMENTS

| | | | | |
|---|---|---|---|---|
| DE | 102017006715 | A1 | 1/2019 | |
| DE | 102017212485 | A1 | 1/2019 | |
| DE | 102021106038 | A1 | 5/2021 | |
| DE | 102020201169 | A1 | 8/2021 | |
| DE | 102021102694 | A1 * | 8/2022 | F17C 13/084 |
| DE | 102021109703 | A1 | 10/2022 | |
| DE | 102022128202 | A1 * | 4/2024 | F17C 13/084 |
| EP | 1452794 | A2 * | 9/2004 | B60S 5/02 |
| GB | 2003251 | A | 3/1979 | |
| WO | WO-2023006554 | A1 * | 2/2023 | F16C 27/063 |

* cited by examiner

TANK SYSTEM FOR A HYDROGEN POWERED VEHICLE, FUEL CELL ASSEMBLY, HYDROGEN INTERNAL COMBUSTION ENGINE SYSTEM, FUEL CELL POWERED VEHICLE, HYDROGEN POWERED VEHICLE

BACKGROUND

The present invention relates to a tank system for a hydrogen-powered vehicle.

Further, the tank system is applicable in a fuel cell assembly or in a hydrogen internal combustion engine system. The invention further relates to a fuel cell drive vehicle and a hydrogen-powered vehicle.

Fuel cells are being increasingly used as energy converters, among other things in vehicles, in order to directly convert the chemical energy contained in a fuel, e.g., hydrogen together with oxygen, into electrical energy. Fuel cells comprises an anode, a cathode and an electrolytic membrane disposed between the anode and cathode. Oxidation of the fuel occurs at the anode, and a reduction of oxygen occurs at the cathode.

Furthermore, vehicles having a hydrogen internal combustion engine system are also known that require a fuel, here hydrogen.

The fuel is typically supplied to the fuel cell via a conduit system from a tank in which the gaseous fuel is stored at high pressure, for example up to 900 bar.

DE 10 2017 212 485 A1 describes such a device for storing compressed fluids that serve as fuel for a vehicle, wherein the device comprises at least two tubular tank containers and at least one high-pressure fuel distributor having at least one integrated control and safety system.

In particular in very long tank containers, an elongation is to be expected caused by the effects of pressure and temperature. In addition, by using materials with greater thermal expansion or less mechanical stiffness, a greater elongation is introduced, which leads to additional loads in the case of tank containers which are mounted fixed on both sides.

SUMMARY

In contrast, the tank system according to the invention has the advantage that the mechanical load on the individual tank containers is reduced by the use of flexible bearings.

For this purpose, the tank system comprises at least two tank containers for storing a gaseous medium, in particular hydrogen, a frame-shaped housing element and a feed line which can be connected to the tank containers. The frame-shaped housing element surrounds the at least two tank containers and the feed line, wherein the at least two tank containers run parallel to a longitudinal axis of the tank system. Each of the at least two tank containers is connected to the frame-shaped housing element by means of a flexible bearing and a fixed bearing. Moreover, the flexible bearing comprises a bearing liner element that comprises layers of an elastomeric material and layers of a rigid material.

Thus, mechanical loads on the tank system or the individual tank containers, for example due to an inclined position during installation, elongations due to temperature and/or pressure influences or tolerance compensation can be minimized using a simple design, and the size and weight of the tank system is reduced.

In the first advantageous further development, it is contemplated that the layers of the elastomeric material and the layers of the rigid material are alternately disposed.

Advantageously, the rigid material comprises steel or aluminum.

In a further embodiment of the invention, it is advantageously provided that the flexible bearing is an axial-less bearing, which in particular fixes the tank container orthogonally to the longitudinal axis and/or at least partially permits movement of the tank container axially to the longitudinal axis.

By installing and bracing the tank containers in the frame-shaped housing element, the layers of the elastomeric material are tensioned in the axial direction and expand in the radial direction due to the approximate incompressibility, meaning they are better compensate for an angular offset, or even axial offset of the frame components, as well as the tolerances in the axial direction.

In an advantageous further development, it is provided that the bearing liner element is configured as a cup spring. This allows for a simple design for installation of the tank containers on the frame-shaped housing element.

In a further embodiment of the invention, it is advantageously provided that the layer of the elastomeric material and/or the layer of the rigid material are formed as a flat disc. Thus, the stiffness of the tank system can be easily adjusted. Furthermore, it is thus also possible to influence the vibration decoupling. In addition, a simple and efficient assembly of the overall tank system is achieved.

In an advantageous further development, it is provided that the layer of the elastomeric material and/or the layer of the rigid material are formed as corrugated in the circumferential direction. Advantageously, the corrugated shape of the layer of the elastomeric material is formed in parallel or in opposition to the layer of the rigid material. This allows efficient dampening of the entire tank system to be achieved.

In an advantageous further development, it is provided that the first end and the second end of the at least two tank containers have a conical taper. Advantageously, the flexible bearing and the fixed bearing are disposed in the area of the conical taper of the at least two tank containers. In this way, design advantages can be achieved, for example a compact and integrated design.

In a further embodiment of the invention, it is advantageously provided that the at least two tank containers are made of steel. Thus, cost savings are achieved in a simple manner by the use of material.

The tank system described herein is preferably suited for use in a fuel cell assembly for storing hydrogen for operating a fuel cell.

The tank system described is preferably suitable in a hydrogen internal combustion engine system.

In advantageous uses, the tank system can be used in vehicles with a fuel cell drive.

In advantageous uses, the tank system can be used in vehicles with a hydrogen drive.

BRIEF DESCRIPTION OF THE DRAWINGS

The invention is described in greater detail below with reference to the drawing.

Shown are.

Figure 1:
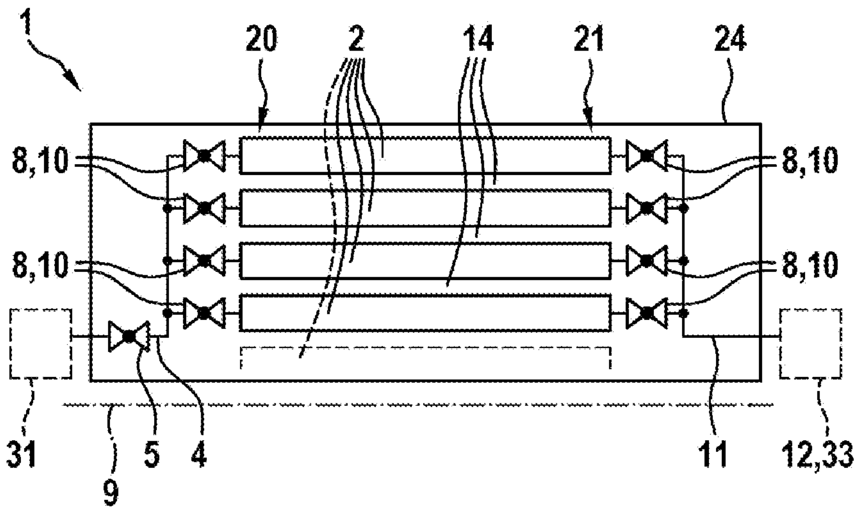
FIG. 1 a schematic plan view of a tank system according to the invention.

All of the drawings are merely schematic representations of the tank system according to the invention or its components according to exemplary embodiments of the invention. In particular, distances and size relations are not reproduced to scale in the drawings.

DETAILED DESCRIPTION

FIG. 1 shows a schematic plan view of a tank system 1 according to the invention for a consumer system 31. The tank system 1 comprises at least two tank containers 2 for storing hydrogen, as well as a frame-shaped housing element 24 and a feed line 4 which can be connected to the tank containers 2. The frame-shaped housing element 24 surrounds the at least two tank containers 2 and the feed line 4, wherein the at least two tank containers 2 run parallel to a longitudinal axis 9 of the tank system 1. Each of the at least two tank containers 2, which are substantially cylindrical and made of steel, comprises at least one valve 8, 10. This at least one valve 8, 10 is a shut-off valve 8 and/or a safety valve 10.

In one exemplary embodiment of the tank system 1, the at least two tank containers 2 each have the shut-off valve 8 at a first end 20, and the safety valve 10 at a second end 21, wherein the respective ends 20, 21 are located towards the longitudinal axis 9 on the respective tank container 2. The two tank containers 2 are at least approximately tubular.

Furthermore, it is shown in FIG. 1 that the shut-off valve 8 is disposed between the respective tank container 2 and the feed line 4, wherein the feed line 4 connects the respective tank containers 2 with the consumer system 31. The consumer system 31 can thus be supplied with a gaseous medium, in particular hydrogen, from the tank system 1 via the feed line 4. The gaseous medium, in particular hydrogen, is here below a high pressure of at least nearly 700 bar.

In the area of the second end 21 of the respective tank container 2 on which the tank container 2 comprises the safety valve 10, the tank container 2 is connected to a connection line 11 via the safety valve 10. In the event of an accident and/or a fire, the connection line 11 serves to direct hydrogen from the respective tank container 2 out of the tank system 1 and thus counteract bursting of the respective tank container 2. At the end of the connection line 11 facing away from the safety valve 10 and/or the tank container 2, in particular its downstream end, there may be a discharge valve 12, via which, in the event of an accident or fire, the hydrogen can be discharged into a surrounding 33 of the vehicle, in particular into an area in which igniting hydrogen can no longer damage or harm the entire vehicle and the occupants.

In one exemplary embodiment, the safety valve 10 may be a so-called TPRD (Thermal Pressure Relief Device) valve 10, which comprises a temperature-sensitive element, in order to trigger an opening of the safety valve 10 in the event of heat input to the tank container tank 2 in an emergency. Thus, in this exemplary embodiment, the first end 20 of the respective tank container 2 is connected to the feed line 4 via the shut-off valve 8 and/or its second end 21 is connected to the connection line 11 via the safety valve 10, which is designed in particular as a melting safety valve 10.

Furthermore, in the area of the connection line 11, in particular between the safety valve 10 and the discharge valve 12, there may be a further valve.

Advantageously, steel is used for the manufacture of the tubular tank modules 2. On the one hand, steel is very robust and on the other hand very inexpensive. Advantageously, steel is very easy to process. Due to the high ductility of steel, there is an improved crash safety of vehicles with tubular tank modules.

Figure 2:
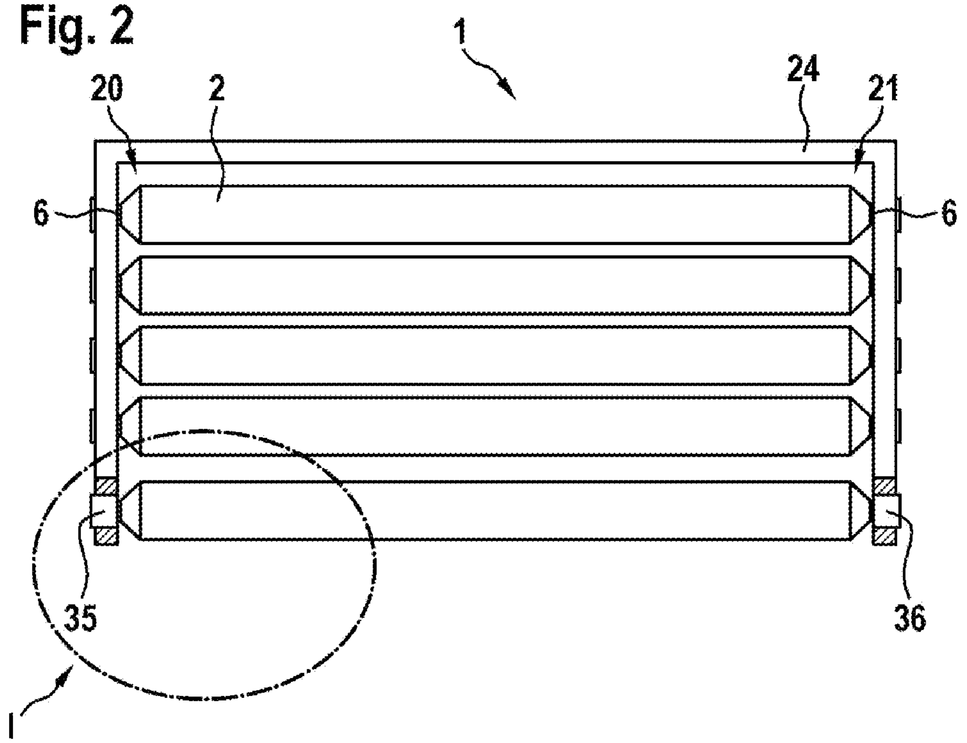
FIG. 2 a further plan view of a tank system consisting of tank containers according to the invention for storing a gaseous medium, FIG. 3 *a*, the area I from FIG. 2 in the area of the bearing liner element in a sectional view, FIG. 3 *b*, the area I from FIG. 2 in the area of the bearing liner element in a sectional view, FIG. 4*a* a cross-sectional view of the bearing liner element in corrugated form of the layer of the elastomeric material parallel to the layer of the rigid material, FIG. 4*b* a cross-sectional view of the bearing liner element in corrugated form of the layer of the elastomeric material opposite to the layer of the rigid material, FIG. 5 a hydrogen-powered vehicle having a fuel cell assembly or a hydrogen internal combustion engine system having a tank system according to the present invention in a simplified schematic view.

FIG. 2 shows a further plan view of a tank system 1 consisting of the tank containers 2 according to the invention for storing a gaseous medium. The tank system 1 comprises a plurality of tank containers 2, which are substantially cylindrical in form. The respective ends 20, 21 of the respective tank container 2 have a conical taper 6 and thus a typical bottleneck structure. The tank containers 2 are connected to the frame-shaped housing element 24 via the ends 20, 21 by means of a flexible bearing 35 and/or a fixed bearing 36. The flexible bearing 35 comprises a bearing liner element 50.

Figure 3A:
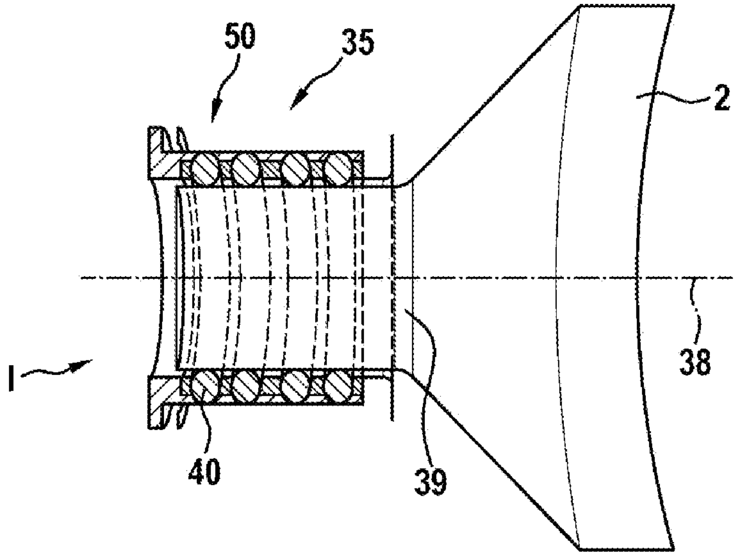
Figure 3B:
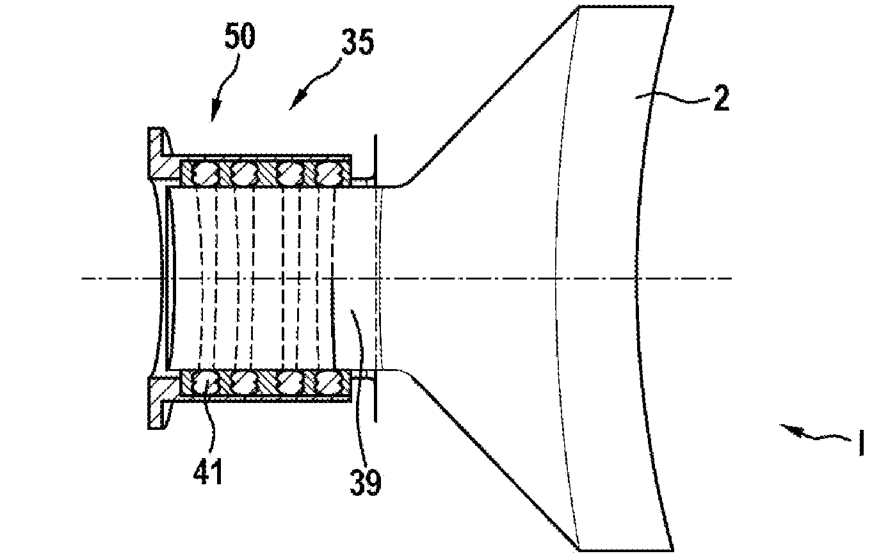

FIG. 3 *a* and FIG. 3 *b* show the area I of FIG. 2 in the area of the bearing liner element 50 in a cross-sectional view. The bearing liner element 50 comprises layers of an elastomeric material 40 and layers of a rigid material 41. These are alternately disposed as shown in FIG. 3*a* and FIG. 3*b*. The rigid material comprises, for example, steel and aluminum.

The flexible bearing 35 is an axial-less bearing, which in particular fixes the tank container 2 orthogonally to the longitudinal axis 9 and/or at least partially permits movement of the tank container 2 axially to the longitudinal axis 9.

The bearing liner element 50 can also be designed in an alternative embodiment as a cup spring in order to at least partially allow movement of the tank container 2 axially to the longitudinal axis 9.

In this embodiment, the layer of elastomeric material 40 and/or the layer of rigid material 41 is formed as a flat disc. The bearing liner element 50 here comprises four flat discs of the elastomeric material 40 and four flat discs of the rigid material 41. In alternative embodiments, a plurality of discs are possible in addition to different thicknesses of the discs.

Figure 4A:
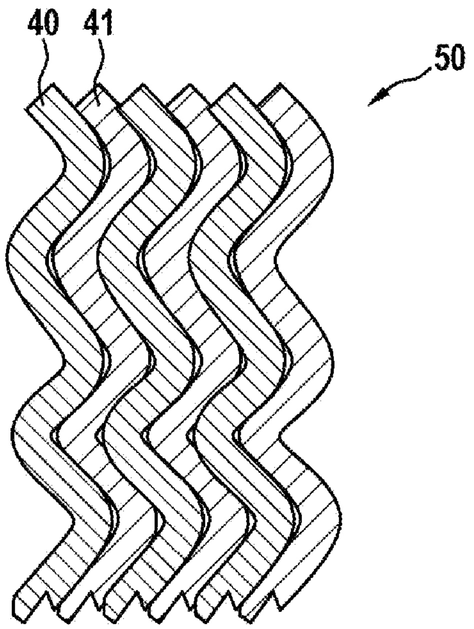
Figure 4B:
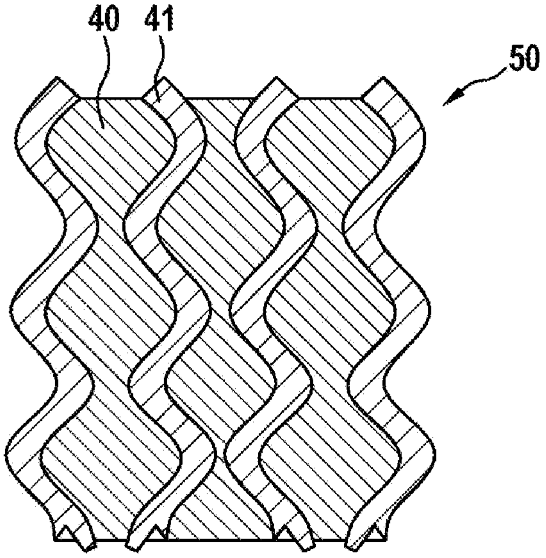

FIG. 4*a* and FIG. 4*b* show an alternative embodiment of the bearing liner element 50 in a cross-sectional view. The layer of the elastomeric material 40 and the layer of the rigid material 41 are formed as corrugated here in the circumferential direction. The corrugated form of the layer of elastomeric material 40 may be configured in parallel, as shown in FIG. 4*a*, or in the opposite direction, as shown in FIG. 4*b*, to the layer of the rigid material 41.

In this way, it can be ensured that expansions of the tank container 2 caused by changes in pressure and temperature during fueling and/or travel operations, in particular along the longitudinal axis 9 of the tank container 2, can be balanced by a variable attachment in the form of the bearing liner element 50. This prevents damage to the tank containers 2 and so leads to a long service life for the overall tank system 1 in addition to compliance with safety-relevant factors.

Figure 5:
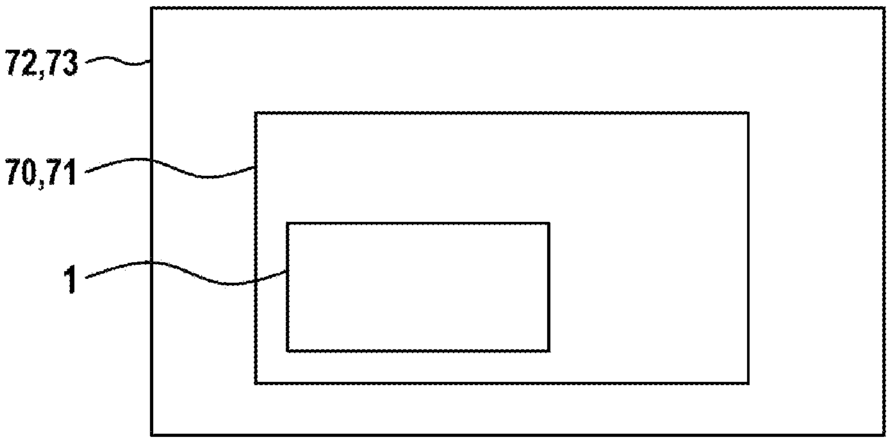

FIG. 5 illustrates, in a simplified schematic view, a hydrogen-powered vehicle 72 that may operate with, for example, a fuel cell assembly 70, a fuel cell-powered vehicle 73, or a hydrogen internal combustion engine system 71.

The fuel cell assembly 70 or the hydrogen internal combustion engine system 71 comprises the tank system 1 according to the invention for providing hydrogen.

The invention claimed is:

1. A tank system (1) for a hydrogen-powered vehicle, wherein the tank system (1) comprises at least two tank containers (2) for storing a gaseous medium, a frame-shaped housing element (24) and a feed line (4) connectable to the tank containers (2), wherein the frame-shaped housing element (24) surrounds the at least two tank containers (2) and the feed line (4), wherein the at least two tank containers (2) run parallel to a longitudinal axis (9) of the tank system (1), wherein each of the at least two tank containers (2) is connected to the frame-shaped housing element (24) by a flexible bearing (35) and a fixed bearing (36), wherein the flexible bearing (35) comprises a bearing liner element (50), with said bearing liner element (50) comprising layers of an elastomeric material (40) and layers of a rigid material (41).

2. The tank system (1) according to claim 1, wherein the layers of the elastomeric material (40) and the layers of the rigid material (41) are alternately disposed.

3. The tank system (1) according to claim 1, wherein the rigid material comprises steel or aluminum.

4. The tank system (1) according to claim 1, wherein the flexible bearing (35) is an axial-less bearing.

5. The tank system (1) according to claim 4, wherein the axial-less bearing fixes the respective tank container (2) orthogonally to the longitudinal axis (9), and/or at least partially permits movement of the respective tank container (2) axially to the longitudinal axis (9).

6. The tank system (1) according to claim 1, wherein the bearing liner element (50) is configured as a cup spring.

7. The tank system (1) according to claim 1, wherein a layer of the elastomeric material (40) and/or a layer of the rigid material (41) is formed as a flat disc.

8. The tank system (1) according to claim 1, wherein a layer of the elastomeric material (40) and/or a layer of the rigid material (41) are formed in a circumferential direction in a corrugated form.

9. The tank system (1) according to claim 8, wherein the corrugated form of the layer of the elastomeric material (40) is formed parallel to or in opposition to the layer of the rigid material (41).

10. The tank system (1) according to claim 9, wherein a first end (20) and a second end (21) of the at least two tank containers (2) comprise a conical taper (39).

11. The tank system (1) according to claim 10, wherein the flexible bearing (35) and the fixed bearing (36) are disposed in an area of the conical taper (39) of the at least two tank containers (2).

12. The tank system (1) according to claim 1, wherein the at least two tank containers (2) are made of steel.

13. A fuel cell assembly (70) having a tank system (1) for storing hydrogen for operating a fuel cell according to claim 1.

14. A hydrogen internal combustion engine system (71) having a tank system (1) for storing hydrogen according to claim 1.

15. A fuel cell-powered vehicle (73) having a tank system (1) for storing hydrogen according to claim 1.

16. A hydrogen powered vehicle (72) having a tank system (1) for storing hydrogen according to claim 1.

* * * * *